United States Patent [19]

See et al.

[11] Patent Number: 5,139,336

[45] Date of Patent: Aug. 18, 1992

[54] OPTICAL MEASURING APPARATUS USING AMPLITUDE MODULATION OF SLIPT BEAMS

[75] Inventors: Chung W. See, London, England; Mehdi Vaez-Iravani, Peekskill, N.Y.

[73] Assignee: National Research Development Corporation, London, England

[21] Appl. No.: 573,150

[22] PCT Filed: Mar. 30, 1989

[86] PCT No.: PCT/GB89/00325

§ 371 Date: Sep. 14, 1990

§ 102(e) Date: Sep. 14, 1990

[87] PCT Pub. No.: WO89/09380

PCT Pub. Date: Oct. 5, 1989

[30] Foreign Application Priority Data

Mar. 31, 1988 [GB] United Kingdom ............... 8807817

[51] Int. Cl.$^5$ .................................................. G01B 9/02
[52] U.S. Cl. ........................................ 356/349; 356/359
[58] Field of Search ................ 356/349, 351, 357, 359, 356/360

[56] References Cited

U.S. PATENT DOCUMENTS

| | | | |
|---|---|---|---|
| 4,298,283 | 11/1981 | Makosch et al. | 356/357 |
| 4,353,650 | 10/1982 | Sommargren | 356/359 |
| 4,456,339 | 6/1984 | Sommargren | 356/359 |
| 4,577,967 | 3/1986 | Fujita | 356/349 |
| 4,627,730 | 12/1986 | Jungerman et al. | 356/349 |
| 4,650,330 | 3/1987 | Fujita | 356/349 |
| 4,741,620 | 5/1988 | Wickramasinghe | 356/349 |

FOREIGN PATENT DOCUMENTS

| | | | |
|---|---|---|---|
| 0011708 | 6/1980 | European Pat. Off. | 356/357 |
| 0108497 | 5/1984 | European Pat. Off. | 356/349 |
| 0167410 | 1/1986 | European Pat. Off. | 356/349 |
| 8800683 | 1/1988 | PCT Int'l Appl. | |
| 2142427 | 1/1985 | United Kingdom | 356/349 |
| 2146116 | 4/1985 | United Kingdom | 356/349 |

*Primary Examiner*—Samuel A. Turner
*Attorney, Agent, or Firm*—Cushman, Darby & Cushman

[57] ABSTRACT

A heterodyne interferometer to achieve simultaneous and independent measurements of amplitude and phase includes a beam splitting device, BS which splits of the incident light beam into two parts with equal amplitudes and an angular deviation, $\alpha$; imposes two unequal frequency shifts $F_1$ and $F_2$ on the two beams and amplitude modulates the two beams in phase quadrature at frequency $F_s$. The two beams emerging from the beam splitter BS are focused by a lens L1 normally on to the surface of an object O. Upon reflection from the object surface, the two beams traverse through the lens and beam splitter a second time, where they are recombined. Both the frequencies and the amplitudes of the two beams will be shifted (or modulated) again after the second passage. The recombined beam is then diverted towards a photodetector PD via the beamsplitter.

7 Claims, 3 Drawing Sheets

OPTICAL MEASURING APPARATUS USING AMPLITUDE MODULATION OF SLIPT BEAMS

This invention relates to optical measuring apparatus and methods and, in particular, to scanning optical profilometers for the simultaneous measurement of amplitude and phase variation during the measurement of a surface.

A scanning optical profilometer has distinct advantages over contact methods such as the stylus probe which can be difficult to operate. In addition optical techniques allow the possibility for remote measurement and are consequently more flexible in their usage. Conventional optical profilometers, however, lack sensitivity: they rely on interfering two light beams which follow separate paths and thus are susceptible to mechanical vibrations. One method to overcome this problem is by operating an optical profilometer in the differential mode. Such systems respond to the variation instead of the absolute phase of the returning light beam. Differential optical profilometers have been shown to have a phase sensitivity of $3 \times 10^{-3}$ mrad in a 1 KHz bandwidth (equivalent to $1.5 \times 10^{-5}$Å in the context of topography).

We have devised a new technique which in addition to monitoring phase variation, allows the simultaneous measurement of the differential of the amplitude of the reflected light. This may be related to the reflectivity of an object. The sensitivity for this mode of operation is similar to existing systems, which is 3 in $10^5$ a 1 KHz bandwidth.

According to the present invention there is provided optical apparatus for measuring the topographical properties of a surface compising means for splitting a beam of radiation into two component beams, means for focussing said two component beams on to a surface under test, means for recombining said two component beams after reflection from said surface to cause interference between said two component beams and means for measuring the differential of at least one parameter of the interference products of said two component beams.

The invention will now be particularly described with reference to the accompanying drawings, in which.

Figure 1:
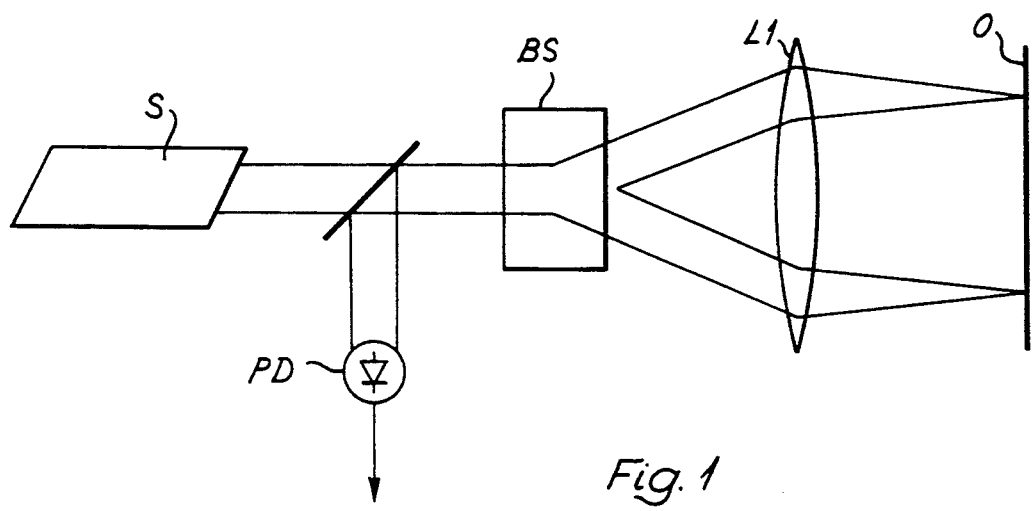
FIG. 1 is a schematic diagram illustrating the principle of the invention.

Referring now to the drawings, we use a heterodyne interferometer to achieve simultaneous and independent measurements of amplitude and phase. The principle of the system is outlined in FIG. 1. The main component is the beam splitting device, BS which has the following properties:

i) splitting of the incident light beam into two parts with equal amplitudes and an angular deviation, $\alpha$;
ii) opposing two unequal frequency shifts $f_1$ and $f_2$ on the two beams;
iii) amplitude modulation of the two beams in phase quadrature at frequency $f_s$.

The two beams emerging from the beam splitter BS are focused by a lens L1 normally on to the surface of an object O. The lens L1 is positioned in the system so that the point of apparent splitting F is at the back focal point of the lens L1 and the object is at its front focal plane. The two beams will then focus normally on to the object with the distance between the two focal spots determined by the value and the focal length of the lens. Upon reflection from the object surface, the two beams traverse through the lens and beam splitter a second time, where they are recombined. Both the frequencies and the amplitudes of the two beams will be shifted (or modulated) again after the second passage. The recombined beam is then diverted towards a photodetector PD via the beamsplitter.

After the first passage through the beam splitter BS the states of the two beams can be written as $$B_1 = A \sin(\omega_s t) \exp\{-j[(\omega_0+\omega_1)t+\phi_1]\} \quad (1)$$

$$B_2 = A \cos(\omega_s t) \exp\{-j[(\omega_0+\omega_2)t+\phi_2]\} \quad (2)$$

where A is the amplitudes of the beams, $\omega_0$ is the optical frequency, $\omega_1$ and $\omega_2$ are the frequency shifts of the two beams, and $\phi_1$ and $\phi_2$ represent the average optical path lengths. After reflection from the object surface, both the amplitudes and the phases of the beams are modified by the object structure. The beams, in front of the photodetector, can then be written as $$B_1 = Ar_1 \sin^2(\omega_s t) \exp\{-j[(\omega_0+2\omega_1)t+\phi_1+\theta_1]\} \quad (3)$$

$$B_2 = Ar_2 \cos^2(\omega_s t) \exp\{-j[(\omega_0+2\omega_2)t+\phi_2+\theta_2]\} \quad (4)$$

where $r_1$ and $r_2$ are the reflection coefficients of the object (at the two foci) and $\theta_1$ and $\theta_2$ are the phase changes imposed on the light beams by the object. The output $I_0$ from the photodiode is proportional to the intensity of the detected beams. Therefore $$I_0 = -\xi(B_1+B_2)(B_1+B_2)^* \quad (5)$$

where $\xi$ is a proportionality constant and * denotes the complex conjugate of the field. By substituting (3) and (4) into (5), we obtain the output from the photodiode $I_0$ as $$I_o = K\,(\tfrac{3}{8}(r_1^2 + r_2^2) + \tfrac{1}{2}(r_1^2 + r_2^2)\cos(2\omega_s t) + \tfrac{1}{8}A^2(r_1^2 + r_2^2)\cos(4\omega_s t) + \tfrac{1}{4}A^2 r_1 r_2 \cos(2\omega_b t + \delta\phi + \delta\theta) - \tfrac{1}{4}A^2 r_1 r_2 \cos(4\omega_s t)\cos(2\omega_b t + \delta\phi + \delta\theta)) \quad (6)$$

where $\omega_b = \omega_1 - \omega_2$, $\delta\theta = \theta_1 - \theta_2$, $\delta\phi = \phi_1 - \phi_2$. The photodetector output therefore contains a number of frequency components. The two important ones are those at frequencies $2f_s$ and $2f_b$. The amplitude of the first one (second term in (6)) is proportional to $r_1 - r_2$ which is the difference in reflectivities of the two neighbouring points on the object surface. The phase of the second one (fourth term in (6)) contains the phase imposed on the light beams by the object. The differential phase/amplitude information of the object can therefore be obtained by detecting these two signals.

After reflection off the sample, now with modified amplitude and phase, they pass back through BS and the interference between the two beams is detected by a photodiode. The output current is proportional to the intensity of the detected light and the resulting signal contains several frequency components of which two are of interest. The differential amplitude response is at frequency $2f_s$ and takes the form, $$A(r_1^2 - r_2^2) \cos(2\omega_s t) \qquad (7)$$

where A is a constant and $r_1, r_2$ are the reflectivities experienced by each beam on the sample surface.

The differential phase result is at frequency $2(f_1 - f_2)$ and is, $$Br_1 r_2 \cos\{2(\omega_1 - \omega_2)t + \delta\theta + \delta\phi\} \qquad (8)$$

where $\delta\theta$ is the phase difference between each returning beam due to the object, and B and $\delta\phi$ are constants.

The differential amplitude $(r_1^2 - r_2^2)$ and differential phase $(\delta\theta)$ information may be related to the surface topography and reflectivity variation.

In a specific embodiment (FIG. 2), the beam splitter is replaced by a Bragg cell BC, which is set up so that the incoming laser light is split into the first and zeroth order. By applying a triangularly modulated drive signal, the Bragg cell amplitude modulates the two beams in phase quadrature. Two detectors D1, D2 are used for the amplitude and phase measurements instead of the one PD shown in FIG. 1. In the present system we use a He-Ne laser of wavelength 632.8 nm, a beam separation on the sample surface of 0.4 mm and a focused beam diameter of 40 $\mu$m.

Figure 3:
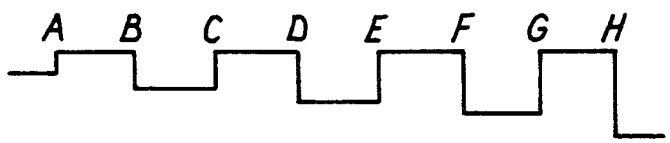
FIG. 3 depicts differential optical phase and amplitude line traces across an etched silicon wafer.
Figure 3:
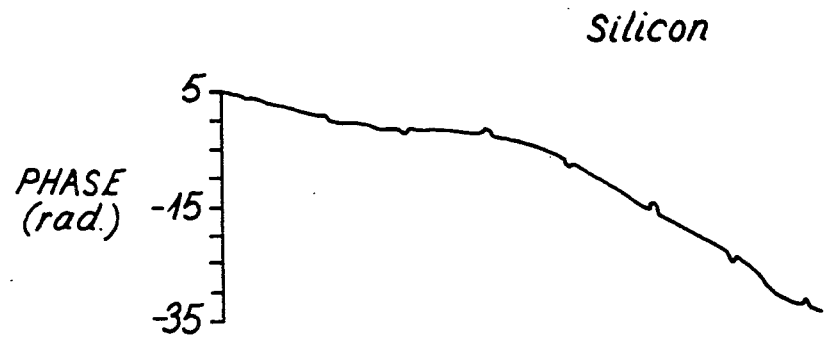
Figure 3:
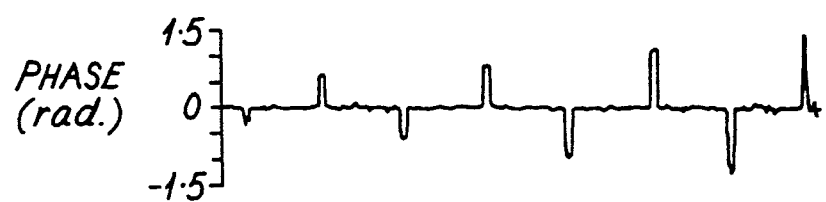
Figure 3:
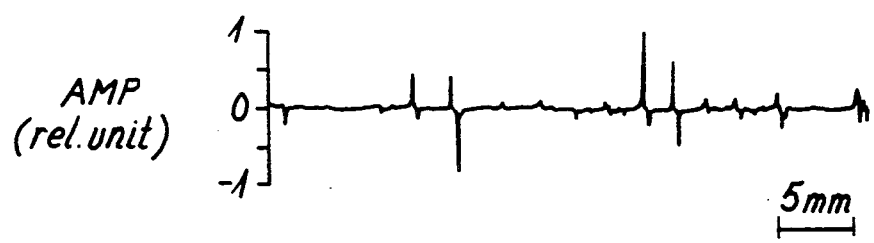

The system was used to examine two samples, one with almost pure topography and the second with primarily reflectivity detail. FIG. 3 shows differential phase and amplitude line traces across a silicon wafer the surface of which has been active-plasma-etched to produce a series of parallel tracks as shown in FIG. 3(a). The nominal step heights are 180Å, 300Å, 400Å, 550Å, and 700Å which were configured by using mechanical stylus to within $\pm 10\%$. The differential phase result (FIG. 3(b)) shows not only peaks corresponding to the edges of the etched tracks, but also an overall phase change across the wafer which is due to warp of the wafer. This background phase variation has been subtracted to produce the trace 3(c). The heights of the peaks at the edges of each track are related to the track depths. Their measured values are shown in Table 1. The discrepancies between the values measured by using the stylus probe and the optical system can be due to the tilt of the sample relative to the incident light beams, the separation of the two beams and the rather large focal spot size. The width of each peak is 0.4 mm., which is the separation of the two interrogating beams. It can be seen that within some etched areas there is more differential phase contrast and this is caused by the rough surface left by the etchant.

FIG. 3(d) shows the differential amplitude result. The differential amplitude contrast for this sample is caused by scattering of light from discontinuities on the sample surface. For this reason, there are differential amplitude responses in the etched regions (due to surface roughness) and at the edges of tracks. Some of the variation is attributable to scratches and dust on the sample surface. The response of a differential system to a point object (phase or amplitude) is a dipole with the pole separation corresponding to the distance between the two interrogating beams. The response to a step structure is the integral of the point response. This is a 'top hat' with its width corresponding to the separation of the two probing beams.

Figure 4:
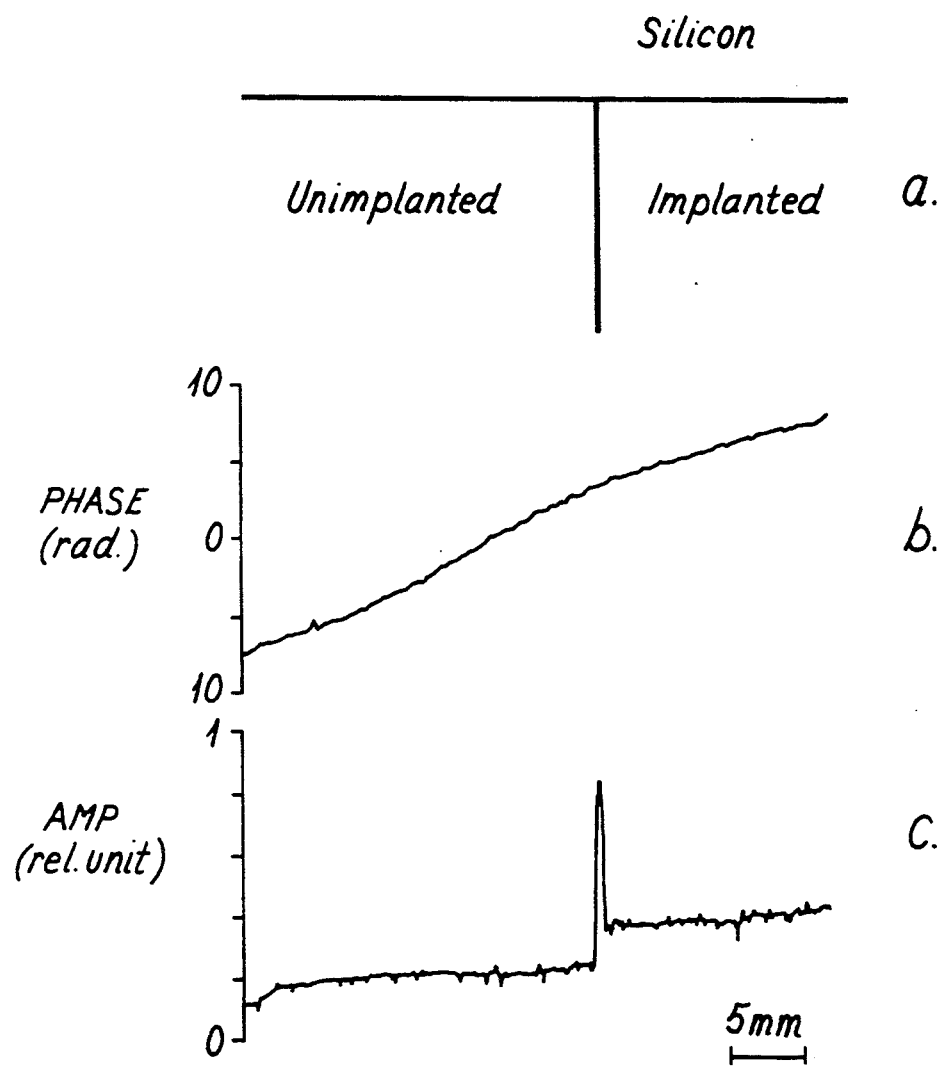
FIG. 4 depicts differential optical phase and amplitude line traces across a partly ion-implanted silicon wafer.

FIG. 4 shows the differential phase and amplitude line traces across a silicon wafer half of which is implanted with $As^+$ at a doping level of $10^{15}$ ions/cm$^2$ (FIG. 4(a)). In FIG. 4(b) it can be seen that any differential phase contrast due to a modification of the refractive index in the implanted region is less than that caused by the roughness of the wafer surface. Again a wafer warp can be seen to exist. The interface between the implanted and non-implanted sides is readily seen from the differential amplitude result in FIG. 4(c). Also, the dc level of the differential amplitude is different on either side of the interface. This is not a real differential amplitude result and is caused by imperfect modulation by the Bragg cell.

Referring to FIGS. 3 and 4, the differential amplitude results consistently show more contrast due to small features than on the phase results. This contrast is caused by scattering.

The simultaneous acquisition of phase and amplitude information enables one to see features on samples which would otherwise show little contrast in an amplitude or phase only system. Another advantage of our system lies in the possibility of eliminating certain ambiguities that arise in metrology applications. A topographically smooth surface may give phase variations due to material differences. The availability of the modulus of the reflection coefficient, i.e. differential amplitude signal, distinguishes between the two cases where the phase response may be due to changes in material reflectivity or topography. In some extreme situations the phase of the complex reflection coefficient may change whilst the modulus remains constant. To eliminate this ambiguity, a different optical wavelength may be employed to further interrogate the sample.

Figure 2:
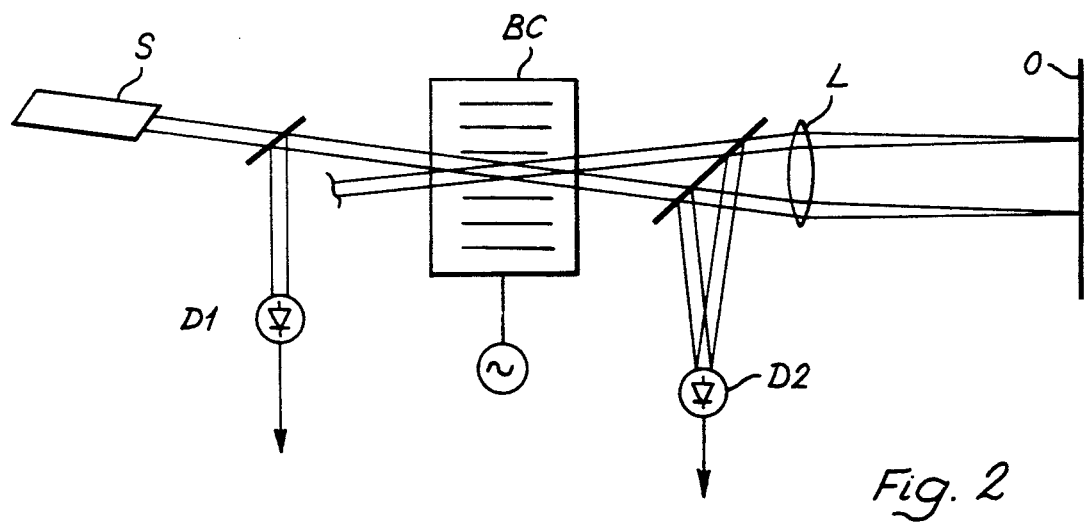
FIG. 2 is a more detailed schematic diagram illustrating a practical embodiment.

As can be seen from the line trace 4(c), there are disadvantages associated with this particular system implementation. The differential amplitude part of the system is not optimised. This is due to an unequal depth of modulation of the two beams emerging from the Bragg cell and results in a signal which has the form $A(r_1^2 - r_1^2)$ where A and B are constants. Hence the line trace comprises true differential amplitude response superposition over an SOM response. The situation is worse if the amplitude result is taken from detector D1 (FIG. 2). If the amplitudes of the two beams are equal, the value of B is zero.

In an alternative embodiment, instead of using the zeroth and first order light beams, the Bragg cell is driven by two signals with frequencies close to the Bragg frequency and the sample is examined by the two first order beams. It is possible for these two beams to have equal amplitude. Furthermore, by changing the frequency difference of the two drive signals, the angular separation and hence lateral spacing of the two beams can be varied.

Applications of this invention include measurements of film thickness, reflectivity variation and surface flatness of samples such as a semiconductor wafer. In some applications a beam separation on the object surface may be desirable.

Another application of the invention is in accurate line width metrology. In addition this technique is ideal for producing high contrast gauges of objects which possess small scale structural variation such as biological tissues. This will require the two focal spots to be close in order to improve lateral resolution, and can be easily achieved by the second implementation of this technique.

TABLE 1

| Step | Step heights measured by using stylus probe and differential optical phase | | | | | | | |
|---|---|---|---|---|---|---|---|---|
| | a | b | c | d | e | f | g | h |
| Step height by stylus probe (Å) | 180 | 310 | 310 | 430 | 430 | 530 | 530 | 700 |
| Diff. phase (radians) | 0.32 | 0.65 | 0.60 | 0.84 | 0.97 | 1.15 | 1.21 | 1.42 |
| Corresp step height (Å) | 163 | 326 | 302 | 424 | 490 | 579 | 609 | 713 |

We claim:

1. Optical apparatus for measuring topographical properties of a surface, comprising:
   means for splitting a beam of radiation into two component beams;
   means for focussing said two component beams onto a surface under test;
   means for recombining said two component beams after reflection from said surface to cause interference between said two component beams; and
   means for measuring a differential of at least one parameter of products of the interference of said two component beams,
   wherein said beam splitting means includes a beam splitting device which is adapted to split an incident light beam into two component beams with equal amplitudes and an angular deviation, to impose unequal frequency shifts and on the two component beams and amplitude modulate each of the two component beams in phase quadrature.

2. Optical apparatus for measuring the topographical properties of a surface as claimed in claim 1, further comprising a lens, wherein the two component beams emerging from the beam splitter are focused by the lens normally onto the surface of an object.

3. Optical apparatus for measuring the topographical properties of a surface as claimed in claim 2, wherein the lens is positioned in the system so that the point of apparent splitting is at the back focal point of the lens and the object is at its front focal plane to focus the two component beams normally onto an object so that upon reflection from the object surface, the two beams traverse through the lens and beam splitter a second time, where they are recombined.

4. Optical apparatus for measuring the topographical properties of a surface as claimed in claim 3, further comprising a photodiode, wherein after reflection off the object and passage through the beam splitter interference between the two component beams is detected by the photodiode.

5. Optical apparatus for measuring the topographical properties of a surface as claimed in claim 1 wherein said beam splitting device is a Bragg cell which amplitude modulates each of the two component beams in phase quadrature and said parameter is the phase or the amplitude, which is measured by a pair of detectors.

6. Optical apparatus for measuring the topographical properties of a surface as claimed in claim 5 wherein the incoming beam of radiation is split into the first and zeroth order by said Bragg cell.

7. Optical apparatus for measuring the topographical properties of a surface as claimed in claim 5 wherein the Bragg cell is driven by two signals with frequencies close to its Bragg frequency and the sample is examined by the two first order beams.

* * * * *